(No Model.)   5 Sheets—Sheet 1.
N. B. RICE.
VACUUM EVAPORATOR FOR SACCHARINE AND GELATINOUS LIQUIDS, MILK, &c.
No. 347,381.   Patented Aug. 17, 1886.
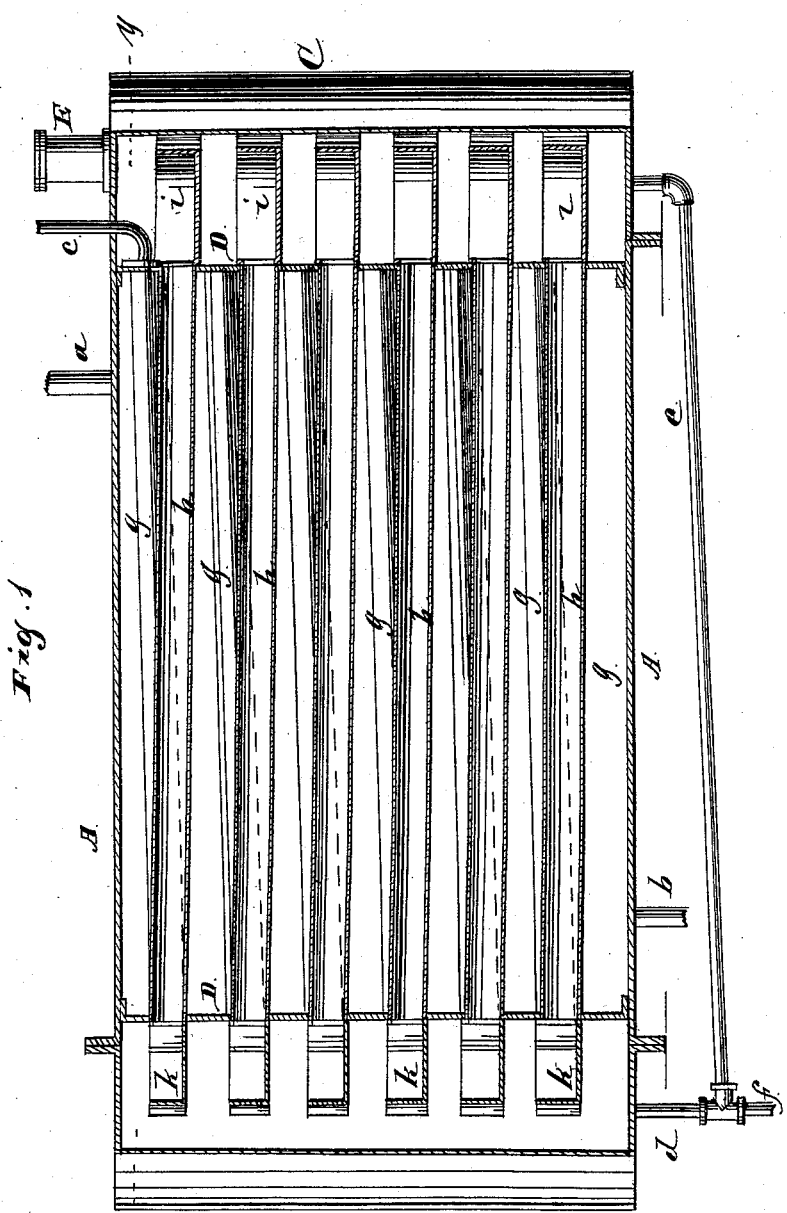

(No Model.)  5 Sheets—Sheet 2.
N. B. RICE.
VACUUM EVAPORATOR FOR SACCHARINE AND GELATINOUS LIQUIDS, MILK, &c.
No. 347,381. Patented Aug. 17, 1886.
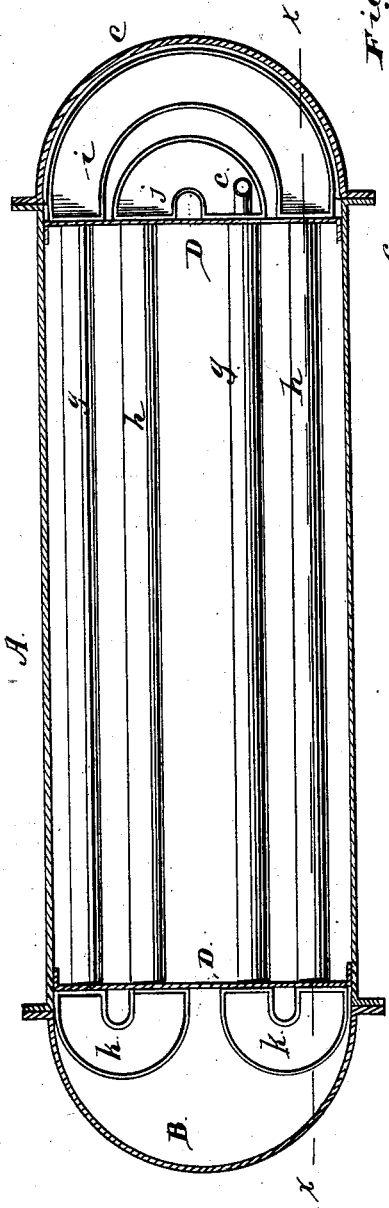
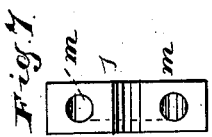
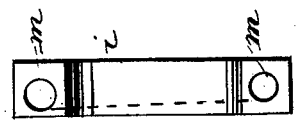
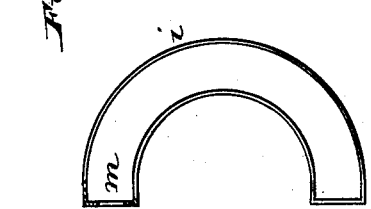
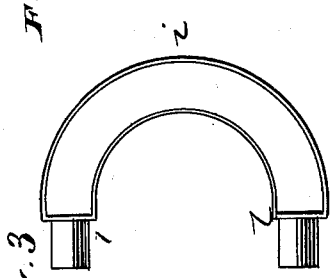
Witnesses:
Albert H. Adams
Harry T. Jones
Inventor:
Nathaniel B. Rice (No Model.) 5 Sheets—Sheet 3.
N. B. RICE.
VACUUM EVAPORATOR FOR SACCHARINE AND GELATINOUS LIQUIDS, MILK, &c.
No. 347,381. Patented Aug. 17, 1886.
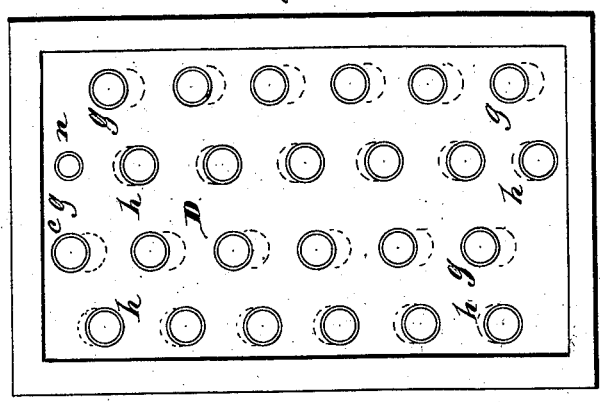
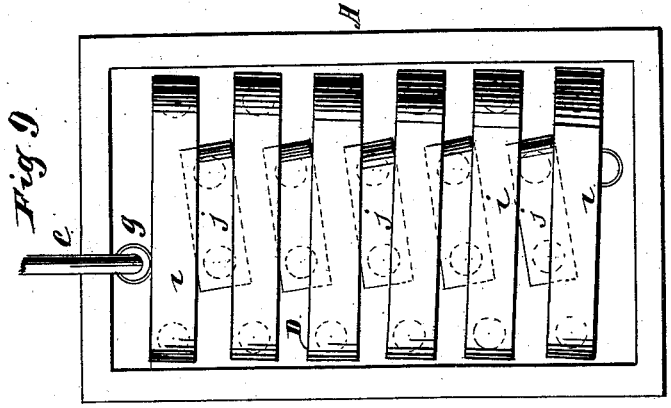
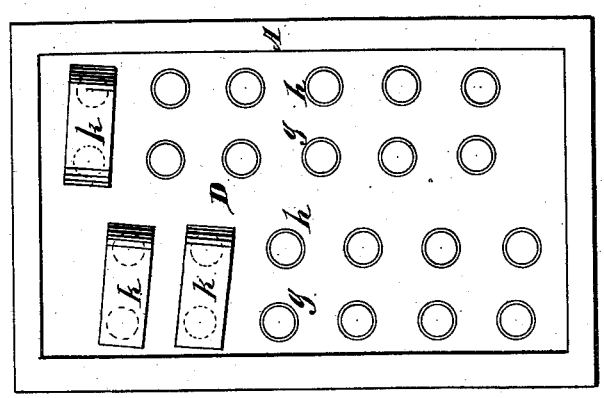
Witnesses:
Albert H. Adams,
Harry T. Jones
Inventor:
Nathaniel B. Rice (No Model.) 5 Sheets—Sheet 4.
N. B. RICE.
VACUUM EVAPORATOR FOR SACCHARINE AND GELATINOUS
LIQUIDS, MILK, &c.
No. 347,381. Patented Aug. 17, 1886.
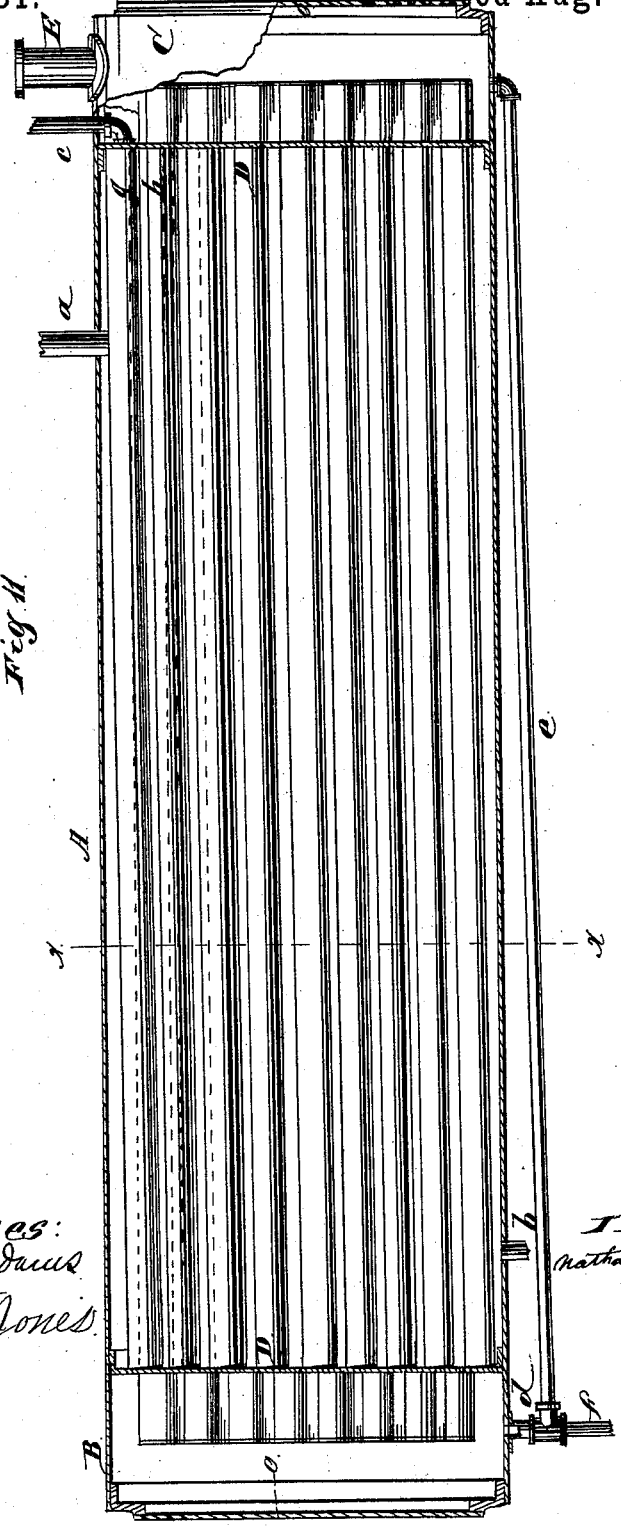
Witnesses:
Albert H Adams
Harry T. Jones
Inventor:
Nathaniel B. Rice (No Model.)  5 Sheets—Sheet 5.
N. B. RICE.
VACUUM EVAPORATOR FOR SACCHARINE AND GELATINOUS LIQUIDS, MILK, &c.
No. 347,381.  Patented Aug. 17, 1886.
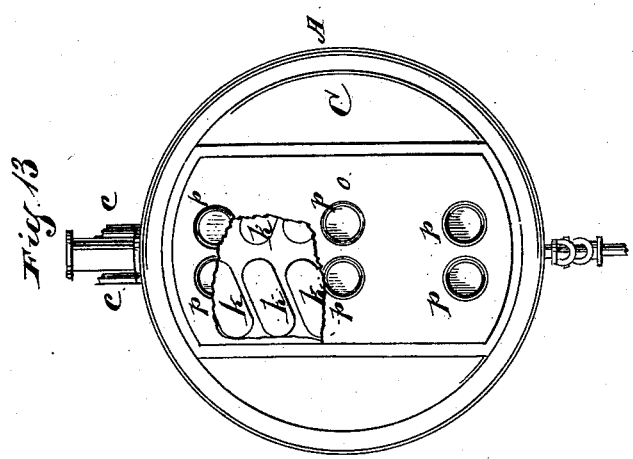
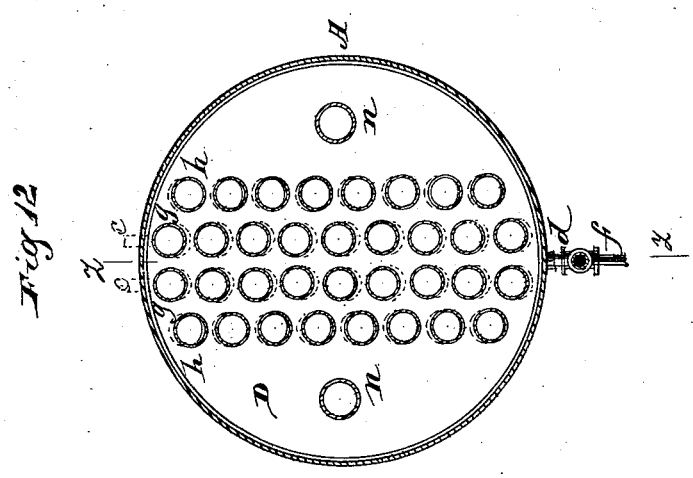
Witnesses:
Albert H. Adams
Harry T. Jones
Inventor:
Nathaniel B. Rice

UNITED STATES PATENT OFFICE.

NATHANIEL B. RICE, OF CHICAGO, ILLINOIS.

VACUUM EVAPORATOR FOR SACCHARINE AND GELATINOUS LIQUIDS, MILK, &c.

SPECIFICATION forming part of Letters Patent No. 347,381, dated August 17, 1886.

Application filed October 20, 1884. Renewed January 21, 1886. Serial No. 189,344. (No model.)

*To all whom it may concern:*

Be it known that I, NATHANIEL B. RICE, residing at Chicago, in the county of Cook and State of Illinois, and a citizen of the United States, have invented certain new and useful Improvements in Vacuum Evaporators for Saccharine and Gelatinous Liquids, Milk, &c., of which the following is a full description, reference being had to the accompanying drawings, in which—

Figure 1 is a vertical section on line $x\ x$ of Fig. 2; Fig. 2, a horizontal section on line $y\ y$ of Fig. 1; Figs. 3, 4, 5, 6, and 7, details; Fig. 8, an end view with the section B removed; Fig. 9, an end view with the section C removed; Fig. 10, a similar view with the pipe-connections all removed; Fig. 11, a vertical section on line $z\ z$ of Fig. 12, having an exterior case cylindrical in form; Fig. 12, a cross-section of a cylindrical form, and Fig. 13 an end view.

My invention relates to evaporators for operating on all substances and materials requiring evaporation—such as glue, meat extracts, milk, gelatinous liquids, saccharine juices, and other liquids or fluids.

In the drawings, A indicates the middle section of the exterior case or shell; B C, end sections of the case or shell; D, partitions or tube-plates; E, exhaust-pipe; $a$, steam-pipe; $b$, pipe for discharging the water of condensation; $c$, liquid-inlet pipe; $d\ e f$, discharge-pipes for liquid; $g\ h$, inclined tubes for the passage of the liquid; $i, j$, and $k$, return tubes or troughs; $l$, tubular projections on the return tubes or troughs; $m$, holes at the ends of said tubes; $n$, tubes or pipes connecting the end sections together for exhaust purposes; $o$, doors; $p$, sight or eye glasses.

The casing or shell A may be made of cast-iron, light boiler-plate, or other suitable sheet metal, and when made of cast-iron it will preferably be made in the angular form shown in Fig. 1, and when made of plate or sheet metal it will preferably be made of the cylindrical form shown on sheets 4 and 5; but both forms, if desired, may be made of either cast, plate, or sheet metal.

The casing A is provided with end plates, D, by which the tubes $g\ h$ are held in position and to which the tubes are tightly secured.

At each end of the middle casing I provide additional casings or sections, B C. These sections are substantially alike and may be curved in form, as shown, or they may be angular. They are so constructed as to furnish the necessary space for the return tubes or troughs $i\ j\ k$, or such portion of them as may be used. These end sections are attached to the middle section by suitable flanges and bolts, so that they may be removed upon any occasion that may require access to the tubes or troughs for purposes of repair, cleaning, or otherwise.

The tubes $g\ h$ are of ordinary metal tubing, and are about six inches in diameter. They are so located in the heads or plates D as to have a little pitch or downward incline. Those marked $g$ are so inclined as to cause the liquid to flow toward the end B. Those marked $h$ have an opposite incline, to cause the liquid to flow toward the end C. These tubes, as shown in Sheets 1, 2, and 3, are connected by return tubes or troughs, so as to make all of the tubes act upon a single stream of liquid flowing through the apparatus or device. The return $i$, located in the end C, connects the outer tubes together, the returns $j$ connecting the inner tubes, while the returns $k$ in the end B connect the outer tubes with the ones next to them, as shown in Fig. 2. These return-tubes are made in trough form, as shown, and by making them in this form the vapors released by evaporation are permitted to escape, and the exhaust given access to the tubes, so as to act upon the return-tubes and through the tubes $g\ h$. These return-tubes are provided with projections $l$, as shown in Fig. 3, which fit into the tubes of the middle section; but instead of this the tubes themselves may be made to project beyond the heads or plates D, and fit into holes $m$; or both plans may be partly adopted—that is, the tube of the middle section may project into one end of the return-tube, and the opposite end of the return-tube may be fitted with a projection or tube $l$, the projecting ends being located in accordance with the flowing of the liquid.

For insuring a free circulation for the exhaust, additional pipes $n$ may be employed to connect the two end sections together, so that such vapors as become freed from the tubes may be exhausted without being again passed through the tubes containing the liquid, and a number of such tubes may be employed; but four will usually be found sufficient for the largest apparatus. The under side of the apparatus is provided with a discharge-pipe, $d\ f$, by which the condensed liquid is carried off or disposed of. The pipes $f$ will be carried off a sufficient length or be provided with traps in any suitable manner, to prevent any reverse currents from the action of the exhaust. The pipe $e$ is a side pipe, connected with the end section, C, for passing off any liquid that may escape into that section.

The condensed or finished liquid may be made to flow directly to the pipe $d$, or it may be discharged upon the bottom of the section B. The rectangular form shown is best adapted for use with short sections of pipe or in restricted situations, where the use of long apparatus would not be desirable, and when the length does not exceed eight or twelve feet stay-bolts will not be necessary, but for longer ones stay-bolts may be applied.

Where the apparatus can be made of considerable length, the circular form shown at Fig. 11 is more desirable. An apparatus of this form is now in use which is twenty-four feet in length and seventy-two inches in diameter, the tubes $g\ h$ being twenty feet long and six inches in diameter, and they are so located as to give them a pitch or incline of two inches, or a variation of four inches for each pair of tubes at the end C, and two inches for each return-trough, making in all a descent of eight inches. This apparatus is provided with two inlets for the liquid, as shown in Fig. 13, and is practically a double apparatus, as the return-tubes $i$ are not used, the returns $k$ being used at both ends. The door in Fig. 13 is partly broken away to show their location and pitch at the end or section C. At the section B they have only the same slight incline that they have in the form shown in Figs. 1 and 2.

Instead of so constructing the end sections, B C, that they may be removable, they may be provided with doors $o$, as shown at Fig. 13, and these doors should be provided with two or three sight or eye glasses, $p$, so that the action of the apparatus may be observed.

In operation the liquid flows into the upper tube, $g$, through the tubes or pipes $c$, at or near the section C, from which it passes through the pipe $g$ to the return $k$ in the end B, back through the tube $h$, through the return $i$ to the tube $g$ on the opposite side, thence through the return $k$, through the tube $h$, and the return $j$ to the next lower tube, $g$, on the same side, and so on until it reaches the bottom. As before stated, in the form shown at Fig. 11, the returns $k$ are the only ones used, so that each side of the apparatus has independent action, and the liquid makes a complete circuit in passing through two tubes and two returns. In either case it is designed that the liquid should be properly condensed by the time it reaches the discharge $d$ ready to pass off through the tube $f$.

The apparatus is heated by admitting either exhaust or live steam into the shell or casing A through the tube $a$, and any water of condensation which may accumulate is drawn off or thrown out through the pipe $b$.

From the operation it will be seen that the casing A forms a middle or steam section, by which the liquid is heated or its original heat maintained, and the end sections, B C, form exhaust-sections, by means of which and through which the freed vapors are carried off, and that the circuit of the liquid is through tubes, a part of which are close and a part open, so that access is given to the action of the exhaust into the open ones and through the close ones, so that the circuit of the liquid is exposed to the action of the exhaust its entire length.

The exhaust is produced by a suitable application to the pipe E of an exhaust-fan, pump, or other ordinary exhausting apparatus.

I am aware that a condensing apparatus has been composed of a casing containing a series of inclined pans; also, that an evaporating apparatus has been composed of a casing containing inclined steam-jacketed tubes alternately connected at their ends by pipes or chambers; and also that a condenser has been composed of two cylinders having an intervening steam-space and the interior cylinder containing a continuous spiral channel. Such features, therefore, I do not claim.

What I claim as new, and desire to secure by Letters Patent, is—

1. The combination of the middle or steam section, A, and the air and vapor sections B C, with the tubes $g\ h$, and open or trough return-tubes, substantially as specified.

2. The combination of the middle or steam section, A, and the end vapor-sections, B and C, with the inclined tubes $g$ and $h$, the open or trough return-tubes in the vapor or steam sections, and the exhaust-tubes $n$, substantially as described.

3. The combination of the middle or steam section, A, having the inclined tubes $g\ h$, with the returns $i, j$, and $k$, and the exhaust end sections, B C, substantially as set forth.

4. The combination of the pipe $e$ with the exhaust-section C and the discharge-pipes $d f$, substantially as and for the purpose specified.

5. The combination of the steam-section A, having the tubes $g\ h$, with the exhaust-sections B C, having open returns, exhaust-pipe E, feed pipe or pipes $a$, and discharge-pipe $d\ f$, substantially as described.

6. The combination of the close tubes $g\ h$ and steam-section with open tubes, and one or more air or exhaust sections, whereby an exhaust-circulation is produced throughout the entire circuit of the liquid, substantially as specified.

NATHANIEL B. RICE.

Witnesses:
O. W. BOND,
HARRY T. JONES.